Patented July 15, 1924.

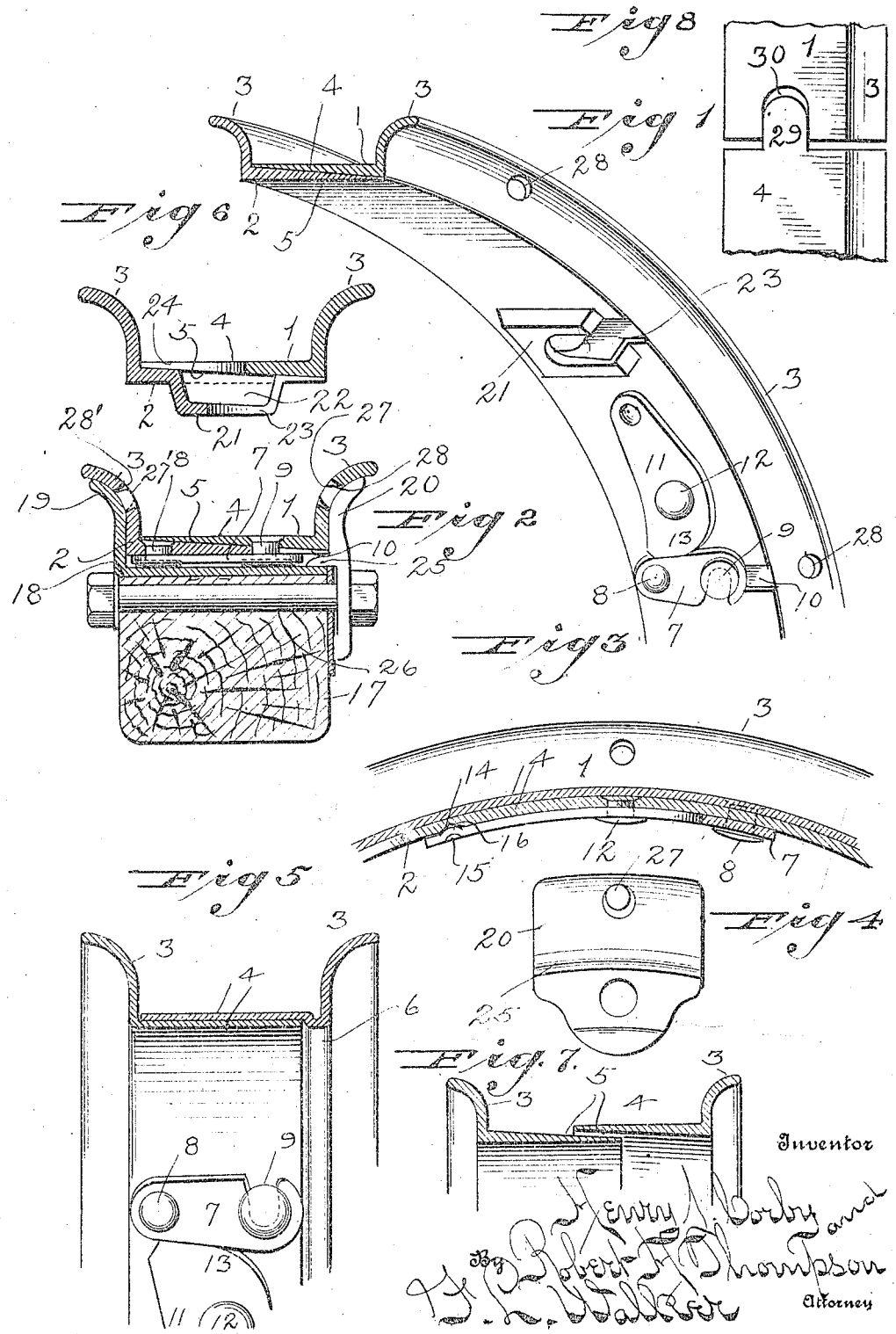

1,501,272

UNITED STATES PATENT OFFICE.

HENRY J. CORBY AND ROBERT H. THOMPSON, OF DAYTON, OHIO; SAID CORBY ASSIGNOR TO SAID THOMPSON.

TIRE RIM.

Application filed August 16, 1920. Serial No. 403,941.

*To all whom it may concern:*

Be it known that we, HENRY J. CORBY and ROBERT H. THOMPSON, both citizens of the United States, residing at Dayton, in the county of Montgomery and State of Ohio, have invented certain new and useful Improvements in Tire Rims, of which the following is a specification.

This invention relates to demountable rims for vehicle wheels, and more particularly to a rim which will facilitate the engagement and disengagement of the tire therewith.

Demountable rims for vehicle wheels, particularly for pneumatic tires for automobiles, have been in common use, but more or less difficulty is encountered in applying and removing the pneumatic casing to and from such rim, although the rims are easily applicable to the wheel structure. The present invention is designed to enable unskilled persons to easily and quickly apply and remove the tire casing from the rim.

The object of the invention is to simplify the structure as well as the means and mode of operation of such devices, whereby they will not only be cheapened in construction, but will be more efficient in use, easily and quickly applied, secure in their engagement and unlikely to get out of repair.

A further object of the invention is to provide an improved form of separable tire channel, having ample clearance to enable its easy adjustment, but firmly engaging one part with the other in the final relation.

A further object of the invention is to provide an improved locking means for securing the separable sections of the tire rim one to the other, both before application to the wheel and while in use.

A further object of the invention is to provide improved means for interconnecting the rim with the wheel felloe to maintain it in fixed concentric relation with the wheel structure and to further prevent rotary or creep movement therewith.

With the above primary and other incidental objects in view as will more fully appear in the specification the invention consists of the features of construction the parts and combinations thereof and the mode of operation or their equivalents as hereinafter described and set forth in the claims.

In the accompanying drawings, embodying the preferred form of the invention, Fig. 1 is a sectional perspective view of a portion of a separable tire rim forming the subject matter hereof. Fig. 2 is a transverse sectional view on line 2—2 of Fig. 1, showing the rim applied to the wheel felloe. Fig. 3 is a circumferential sectional view of the rim, showing the relation of the locking means. Fig. 4 is a detail view of one of the rim clamp plates viewed from the inner face thereof. Fig. 5 is a detail view of a modification of the tire rim, showing in connection therewith the same interlocking means as employed with the rim illustrated in the preceding view. Fig. 6 is a transverse sectional view, showing the relation of the parts at the point of engagement with the valve stem of the tire. Fig. 7 shows the separate sections positioned for engagement. Fig. 8 is a detail plan view, showing the rim severed transversely.

Like parts are indicated by similar characters of reference throughout the several views.

The demountable tire rims most commonly in use comprise an annular channel split transversely, the adjacent ends of which are drawn into overlapping relation to enable the insertion and removal of the tire casing. Another type of demountable rim embodies a removable ring which forms one flange of the channel which is locked in position by a second ring engaged with the main portion of the channel structure. In the first type of device mentioned, great difficulty is experienced in drawing the ends of the channel into sufficiently overlapping relation to enable the easy removal or insertion of the tire, while in the second type of device, great effort is required to force the second bead flange of the tire casing on to the channel base a sufficient distance to enable the insertion of the retaining and locking ring. The present construction is designed to enable the insertion and removal of the tire with minimum effort by dividing the channel circumferentially into two separable sections, each provided with a marginal flange and with overlapping base portions, so shaped as to easily enter one within the other, with the tire casing engaged in distended form between the marginal flanges of the respective members. These members are then drawn together uniformly clamping the base or bead flanges of the tire casing, between the marginal flanges of the rim.

As illustrated in the drawings, the channel to receive the tire, comprises two peripheral separable sections 1 and 2, each having thereon a peripheral marginal flange 3. This flange may be of any suitable shape or contour to agree with the type of tire to be engaged. While an outwardly flaring peripheral flange 3 has been shown, it will be obvious that the well known inturned or clencher type of flange may be substituted without departing from the invention. The base portions 4 of the respective members 1 and 2 extend substantially the full width of the channel in overlapping relation one with the other. Their engaging faces are laterally inclined or beveled as at 5. This beveled form of the base or bottom of the channel enables the inner or male member 2 of the rim to be readily inserted within the outer or female member 1, with ample clearance between the members. This clearance between the interengaging members of the channel in their initially adjusted relation avoids all necessity for great accuracy in the adjustment of the members, and will be at once apparent by reference to Fig. 7, in which the members are shown separated in relation for readjustment one with the other. It will be obvious that as the members are pressed one toward the other with the bead margins of the tire engaged therebetween, this margin of clearance will be gradually reduced until in their finally adjusted relation the beveled or inclined faces will firmly engage one upon the other, with a wedging or camming action, by which they are firmly seated to afford all of the advantages of a single or integral construction.

In lieu of the tapered base or bottom portions as before described, the flanged sections of the rim may be formed or rolled from sheet metal, without such taper, as is shown in Fig. 5. However, this construction will necessitate accurate adjustment of the member to prevent binding or undue strain of the parts in effecting their adjustment. One of the members in this modified form has been shown formed with an inner circumferential bead 6, which affords a finish for the side of the rim, and conceals the edge of the innermost or inserted overlapping member. It also affords an abutment for said member while the outer or enclosing member of the overlapping base portion abuts upon the inner side of the opposite peripheral flange. It will be understood that in both of the constructions heretofore described, that the members 1 and 2 are continuous annuli. Each annulus is of an angle formation. The base flange of such angle in the preferred form is transversely inclined or tapered.

In order to fixedly engage these members in their adjusted relation one with the other, there is provided upon the inner periphery of the innermost or male member 2, a pivoted hook 7 of a flattened formation preferably formed from sheet metal. Any number of these hooks may be employed, preferably three or more, spaced at regular intervals about the interior of the rim. The hooks 7 are pivoted upon studs 8, riveted welded, or otherwise secured to the base portion 4 of the inner or male member 2, and are adapted to engage like studs 9 carried by the second rim member 1. The inner or male member 2 is provided with marginal notches 10, within which the studs 9 of the opposing member project, the projecting portions of these studs being engaged by the hook 7, to prevent the separation of the members 1 and 2. To prevent the accidental disengagement of the hook 7, from the engaged stud 9, there is provided adjacent thereto a pivoted locking cam lever 11, pivoted at 12 and having an eccentric head 13, adapted upon oscillation of the locking lever 11 to engage the rear margin or back of the hook 7, to force it into locking engagement with the stud 9 and so hold it thereafter. This locking cam lever 11, when turned to a transverse relation with the rim releases the hook 7 and permits its oscillation away from the stud 9. In its locking position, the cam lever 11 is alined with the rim, and is somewhat curved to agree with the curvature of the rim member upon which it is secured. To retain the locking cam lever 11 in its locking position, the inner rim member 2 is preferably provided with a depression 14, in the inner circumferential face thereof, and the locking lever 11 is provided with a corresponding depression 15 forming on the opposite or adjacent face of the locking lever, a resulting projection or boss 16, which is adapted to engage in the recess or depression 14, within the rim when the lever is in its adjusted locking position. As now constructed the demountable rims are of greater internal diameter than the external diameter of the wheel felloe, whereby there is afforded an intervening annular space between the rim and the felloe, sufficient to accommodate the locking hook 7 and lever 11. Hence the present invention will not necessitate any change in proportion or construction of the present vehicle wheels, and will accommodate and agree with the present vehicle tires to be applied to such wheels. Hence the present rim is adapted to be substituted for the rims now in use, without otherwise necessitating any change in the wheel or tire structure or size. The space necessary for the accommodation of the locking members 7 and 11, exists in the present wheel and tire construction.

The hook member 7 is primarily intended to retain the rim members in their interlocked relation, prior to their engagement upon the felloe of the wheel. It is the practice to mount the tire upon such demountable rim and inflate it preparatory for use, carrying it upon the vehicle for emergency use in the event of an accident to a tire in operation. The locking means thus described will hold the rim members in engagement during such temporary or reserve period as well as when the rim is mounted upon the wheel.

In practice it is now the custom to mount upon the felloe 17 of the wheel a flanged felloe rim 18, the marginal flange 19 of which forms an abutment for the tire rim, which carries the pneumatic or other vehicle tire. These tire rims of whatever style are held in engaged position upon the felloe by means of clamp plates 20. Means is provided to prevent the creep or rotation of the rim upon the felloe. This means ordinarily comprises a boss or inwardly projecting lug such as shown at 21, Fig. 1, which engages within a corresponding recess or socket in the periphery of the felloe. This construction need not be changed to enable the use of the features of the present invention heretofore described. The inner or male member 2 of the rim channel may be provided with a peripheral depression 22 forming the inward projecting boss 21, for interlocking engagement with the wheel felloe in the usual manner. As shown in the drawings the rim members 1 and 2 at this point have been formed with overlapping oppositely disposed marginal notches, or slots 23 and 24, the inner overlapping portions of which form an orifice for the passage of the valve stem of the tire. It will be obvious that these overlapping slots need not be located coincident with the lug 21, but may be at any point upon the tire rim. However, this is a convenient point and is the customary point for the location of the valve stem orifice at the present time. While the present mode of securing the tire rim upon the felloe by means of the usual clamp plate 20, and an inter-locking lug and socket connection between the rim and felloe is entirely practical for securing the improved rim heretofore described, a special form of interlocking connection for the rim is provided. In Figs. 2 and 4, the ordinary clamp plate 20 has been shown provided with inwardly projecting lugs or studs 27, adapted to engage in corresponding holes 28 in the marginal flange of the rim. There is also provided upon the inner face of the clamp plate 20, a beveled or tapered bead 25, which projects into the intervening space between the face of the rim and the felloe plate or rim 18, and as the plate 20, is drawn inward to clamp the tire rim by means of the clamp bolts 26 this tapered or beveled bead or flange 25 affords a wedging or camming action, which serves to tighten the rim radially upon the wheel, and by uniform adjustment of the several clamp plates, the concentricity of the rim and wheel is secured. The clamping plate 20 shown in Figs. 2 and 4 thus serves to secure the demountable rim not only by the usual clamping force in a transverse or inward direction, but also exerts an outward or radial pressure upon the rim, and in addition thereto the engagement of the studs or bosses 27, in the holes 28 serve to anchor the rim positively to prevent creeping or rotary variation. The inward projecting flange 25 bearing upon the periphery of the felloe, further resists any oscillation or twisting movement of the clamp plate about the clamp studs 26 under the influence of such creeping or rotary tendency of the rim. In lieu of the anchor studs or bosses 27 upon the clamp plate 20, such anchorage studs or bosses may be located upon the inner face of the felloe rim flange 19, as shown at 27' to engage holes 28' in the opposite channel rim flange. Only one set of these studs will be required, but it is obvious that they may be located either upon the flange 19, or upon the clamp plates 20. By providing the holes in the opposite flanges of the channel rim the rim may be applied to the wheel with either side outermost. By changing the tires from time to time, by reversing the rim, the wear upon the tire and rim may be equalized and uniformly distributed.

While under ordinary conditions, and with the standard size and type of tires the rim member 1 may be easily and readily inserted within the tire, it may be advantageous in order to meet certain conditions to provide for a slight contraction of the rim member 1 to facilitate its insertion within the tire. Although in the preferred embodiment the rim member 1 is a continuous or complete annulus, in order to provide elasticity, it may be severed transversely as shown in detail plan view Fig. 8. In this figure the inner member only is shown transversely severed on a meanderous line, which will afford a projecting tongue 29, upon one end of the member 1, and a corresponding recess or notch 30 on the other end of the member to be engaged by said tongue 29. Sufficient clearance is permitted between the ends to enable the contraction of the member 1 sufficient to permit it to easily enter within the tire. The insertion of the male member 2 within the member 1 and the drawing of the parts in the final relation, will effect the expansion of the contracted tire engaging member 1 to its normal diameter and in close engagement with the tire. It will be understood that the insert clearance for the contraction of the member 1 to a subnormal diameter will form a slot or curve in the marginal flange 3 when the tire is in its adjusted relation. The marginal flange 3 with this clearance slot may be placed adjacent to the felloe rim flange 19, which will cover and protect the clearance slot, or it may be so positioned as to be overlaid by a clamp plate 20. In such construction the engagement of the bosses 27 or 27' within the holes 28 or 28', as the case may be, on opposite sides of this point of separation will firmly and securely hold the rim in its adjusted relation while in use. In any event the rim parts cannot possibly become separated. This construction will facilitate the engagement and dis-engagement of a tight fitting tire without interfering with the successful operation of the device or disposing with its advantages.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. In a tire rim, an annular channel comprising two beveled rings each provided with a marginal flange, one of said rings being insertable within the other ring with their beveled faces overlapping and in contact, marginal notches in the innermost ring, inward projecting studs in the outermost ring engageable within said notches, and lock means for engaging the stud to interlock the rings including a flexible arm pivoted to the inner face of the inner ring having a projecting boss engaging in an indentation in the inner face of the inner ring to retain the stud engaging lock in adjusted position.

2. A demountable rim embodying two flanged rings arranged in overlapping relation with one ring extending within the other ring to form an annular channel, one of the rings being transversely severed and provided with interengaging terminal tongue and notch whereby said ring may yield circumferentially but its ends are maintained in alinement, and means for detachably engaging the rings one with the other.

In testimony whereof, we have hereunto set our hands this 17th day of July A. D. 1920.

HENRY J. CORBY.
ROBERT H. THOMPSON.

Witnesses:
ALFRED McCRAY,
GEORGE C. HELWIG.